(12) United States Patent
Kim (10) Patent No.: US 8,262,158 B2
(45) Date of Patent: Sep. 11, 2012

(54) CONVENIENCE APPARATUS FOR AUTOMOTIVE REAR SEATS

(75) Inventor: Young Kim, Hwaseong (KR)

(73) Assignee: Hyundai Motor Company, Seoul (KR)

(*) Notice: Subject to any disclaimer, the term of this patent is extended or adjusted under 35 U.S.C. 154(b) by 31 days.

(21) Appl. No.: 13/024,212

(22) Filed: Feb. 9, 2011

(65) Prior Publication Data

US 2011/0193374 A1     Aug. 11, 2011

Related U.S. Application Data

(63) Continuation-in-part of application No. 12/082,114, filed on Apr. 8, 2008, now abandoned.

(30) Foreign Application Priority Data

Oct. 15, 2007  (KR) .......................... 10-2007-0103635

(51) Int. Cl.
  *A47C 7/62*   (2006.01)
  *A47C 13/00*  (2006.01)
(52) U.S. Cl. ................. 297/115; 297/188.17; 297/217.3
(58) Field of Classification Search .................. 297/115, 297/117, 188.15, 188.16, 188.17
See application file for complete search history.

(56) References Cited

U.S. PATENT DOCUMENTS

| | | | | |
|---|---|---|---|---|
| 5,516,191 A | * | 5/1996 | McKee | 297/188.15 |
| 5,680,974 A | * | 10/1997 | Vander Sluis | 296/37.9 |
| 5,720,514 A | * | 2/1998 | Carlsen et al. | 297/188.1 |
| 7,104,609 B2 | * | 9/2006 | Kim | 297/188.16 |

* cited by examiner

*Primary Examiner* — Anthony D Barfield
(74) *Attorney, Agent, or Firm* — Edwards Wildman Palmer LLP; Peter F. Corless (57) ABSTRACT

A convenience apparatus for automotive rear seats includes: a base gear fixed to at least one of the rear seats, a space between which an arm rest is movably mounted; a driver, which has a driving gear engaged with the base gear and a motor for rotating the driving gear, for folding or unfolding the arm rest into or from the space using a driving force of the motor; an integrated audio/video (AV) monitor which is rotatably coupled to a front end of the arm rest and is connected to the driving gear through a gear train so as to be able to be folded or unfolded with respect to the arm rest while the arm rest is folded or unfolded; and a cup holder which is mounted so as to be able to slide into or out of a hole defined in the front end of the arm rest and is connected to the driving gear through the gear train so as to be able to move into or out of the arm rest while the arm rest is folded or unfolded.

10 Claims, 6 Drawing Sheets

CONVENIENCE APPARATUS FOR AUTOMOTIVE REAR SEATS

CROSS-REFERENCE TO RELATED APPLICATIONS

This application is a continuation-in-part application of U.S. application Ser. No. 12/082,114 now abandoned, which claims priority to Korean Application No. 10-2007-0103635, filed on Oct. 15, 2007, the disclosure of which applications are incorporated herein by reference.

BACKGROUND

1. Technical Field

The present invention relates to a convenience apparatus for automotive rear seats, which can automatically move an audio-video (AV) monitor and a cup holder mounted in an arm rest upon operation of the arm rest.

2. Background Art

Typically, an arm rest is installed between automotive rear seats so that passengers can take a rest by putting their arms on the arm rest.

Figure 1:
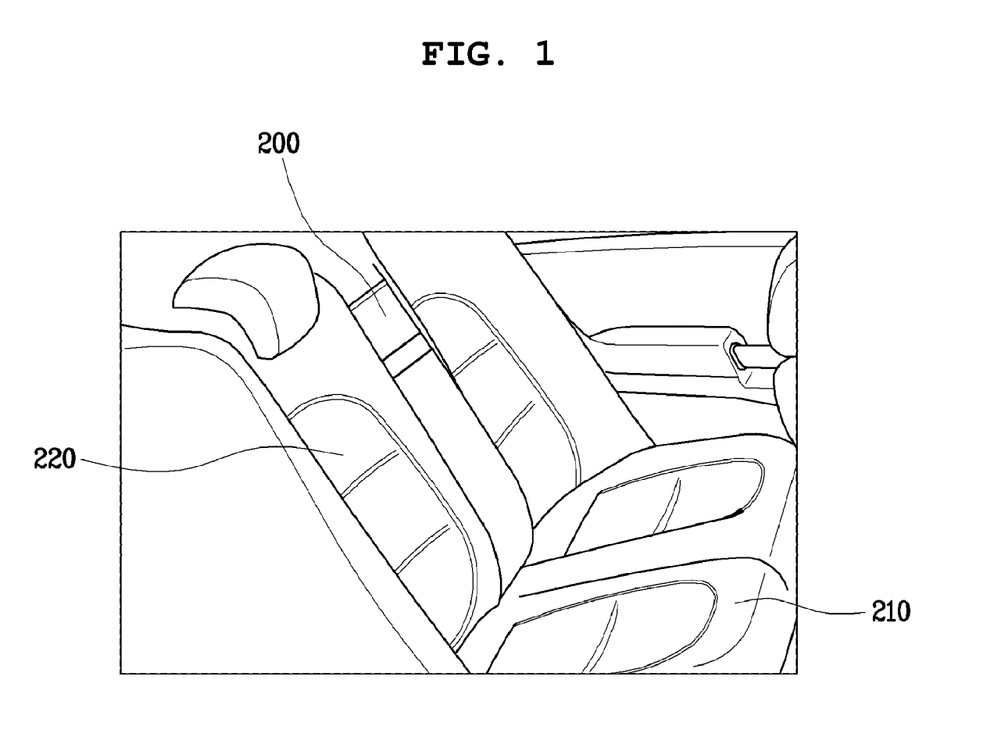
FIG. 1 is a perspective view illustrating rear seats and an arm rest of a vehicle according to the related art.

As illustrated in FIG. 1, the arm rest 200 disposed between the rear seats 210 can be folded toward the backrests 220 of the rear seats 210. This arm rest is provided with a storage box for storing small portable articles or a cup holder, as appropriate, a controller capable of controlling audio, a seat warmer, setting a seat angle, and so forth.

Meanwhile, an audio-video (AV) monitor for rear seat passengers has recently been mounted in a vehicle in order to offer better convenience to the passengers. This AV monitor employs a touch screen, and is most often mounted on the back of a front seat. Hence, the passenger must endure discomfort in that he/she must reach in order to operate the touch screen. In order to increase the convenience and efficiency of use of space of an automotive interior, it is necessary to develop an integrated convenience apparatus, such as the video display assembly disclosed in EP Patent No. 545691.

The information disclosed in this Background section is only for enhancement of understanding of the background of the invention and should not be taken as an acknowledgement or any form of suggestion that this information forms the prior art that is already known to a person skilled in the art.

SUMMARY OF THE DISCLOSURE

Accordingly, the present invention has been made keeping in mind the above problems occurring in the prior art, and one of the objects of the present invention is to provide a convenience apparatus for automotive rear seats, in which an arm rest, an audio-video (AV) monitor, etc. are integrated to increase the convenience and efficiency of use of space.

In order to achieve the above and other objects, in one aspect, there is provided a convenience apparatus for automotive rear seats. The apparatus comprises: a base gear which is non-rotatably fixed to at least one of the rear seats, a space between which an arm rest is movably mounted; a driver, which has a driving gear engaged with the base gear and a motor for rotating the driving gear, for folding or unfolding the arm rest into or from the space using a driving force of the motor; an integrated audio/video (AV) monitor which is rotatably coupled to a front end of the arm rest and is connected to the driving gear through a gear train so as to be able to be folded or unfolded with respect to the arm rest while the arm rest is folded or unfolded; and a cup holder which is mounted so as to be able to slide into or out of a hole defined in the front end of the arm rest and is connected to the driving gear through the gear train so as to be able to move into or out of the arm rest while the arm rest is folded or unfolded.

In a preferred embodiment, the motor is mounted in the arm rest and the driving gear is rotated in engagement with the base gear by the motor.

In another preferred embodiment, the gear train includes a dual gear connected with the driving gear so as to be able to transmit power and a rotary gear coupled to a rotating shaft of the integrated AV monitor so as to pivot the integrated AV monitor. Preferably, the gear train may include a plurality of intermediate gears between the driving gear and the dual gear, and at least one pair of the intermediate gears is disposed apart and connected by a belt. Also preferably, the dual gear may include a rubber roller and a plane gear coaxially and integrally formed with the rubber roller. Preferably, the rubber roller is in surface contact with an upper surface of the cup holder so as to be able to move the cup holder in forward and backward directions, and the gear integrated with the rubber roller is engaged with the rotary gear of the integrated AV monitor.

In still another preferred embodiment, the integrated AV monitor has a touch screen operation mode, and displays an option menu including a radio, audio, video, and rear seat selection controller such that a passenger of the vehicle controls at least one of the rear seats through the integrated AV monitor.

In yet another preferred embodiment, the cup holder includes a flat body including a plurality of cup holes therein, into which a cup can be inserted and fixed.

In a further preferred embodiment, the arm rest includes a stopper for supporting the integrated AV monitor at the front end thereof.

Preferably, the flat body of the cup holder is provided with at least one roller rotatably supported thereunder for smoothly sliding the cup holder into or out of the hole defined in the arm rest.

According to the preferred embodiments, the integrated AV monitor and the cup holder are mounted in the arm rest between the rear seats, and as the arm rest is unfolded, the integrated AV monitor is automatically unfolded and the cup holder automatically moves in a forward direction. Thus, passengers can conveniently control the rear seat(s) through the integrated AV monitor. Further, the efficiency of use of space inside the vehicle can be maximized because no space for installing separate controllers in the interior of the vehicle is required.

Also, since passengers control the rear seat using the integrated AV monitor that unfolds from the arm rest, the viewing angle of the passenger is greatly improved compared with the prior art. Further, since the arm rest, the cup holder, and the integrated AV monitor can be moved by a motor, overall performance of the apparatus is improved. In addition, since the arm rest, the cup holder, and the integrated AV monitor are located in the rear-seat backrest space when not used, the apparatus can be easily protected from damage.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

A convenience apparatus 1 for automotive rear seats is designed to cooperate with a common arm rest 5 of the automotive rear seats.

Figure 2:
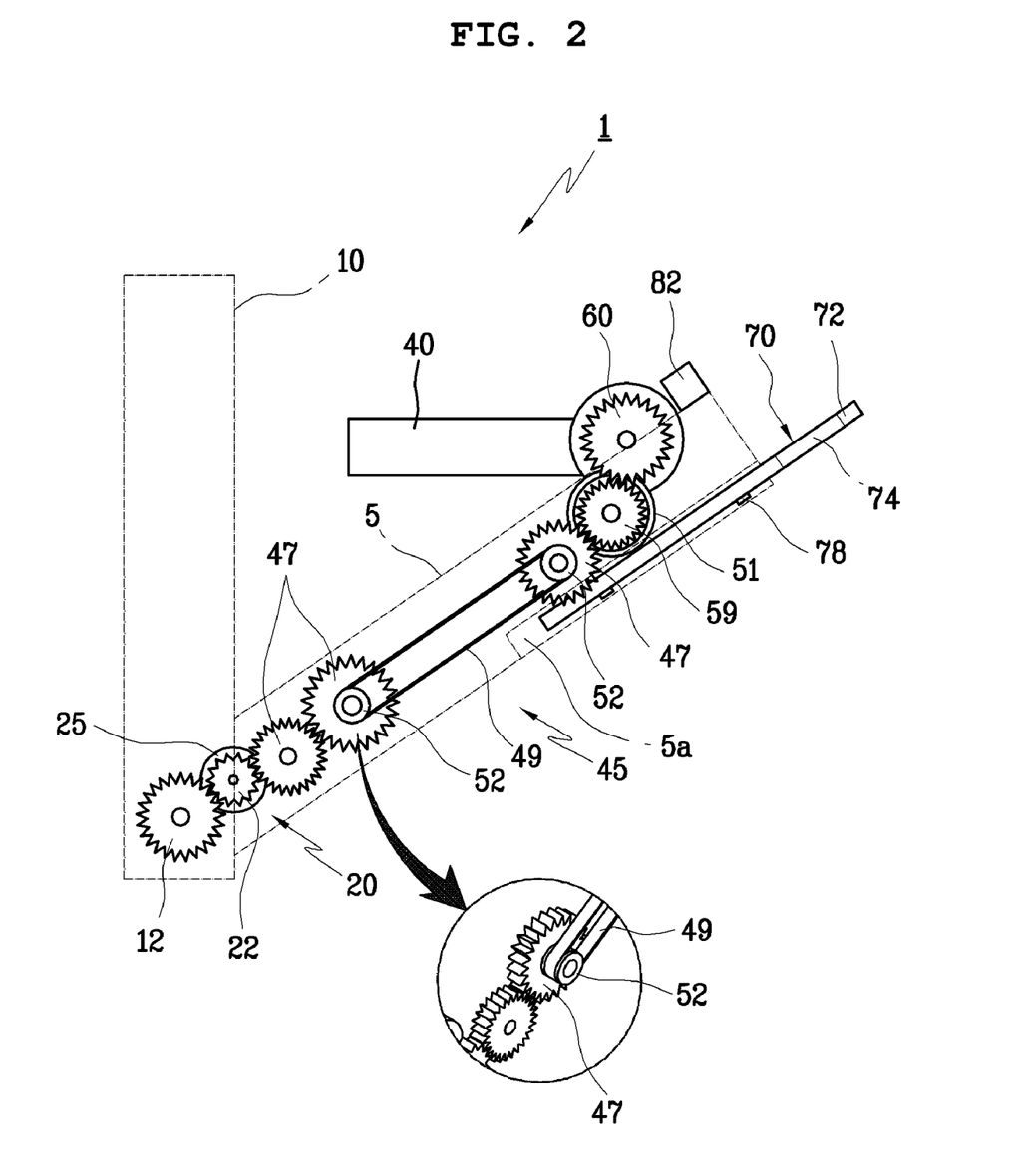
FIG. 2 is a side sectional view illustrating a convenience apparatus for automotive rear seats according to a preferred embodiment of the present invention.
Figure 3:
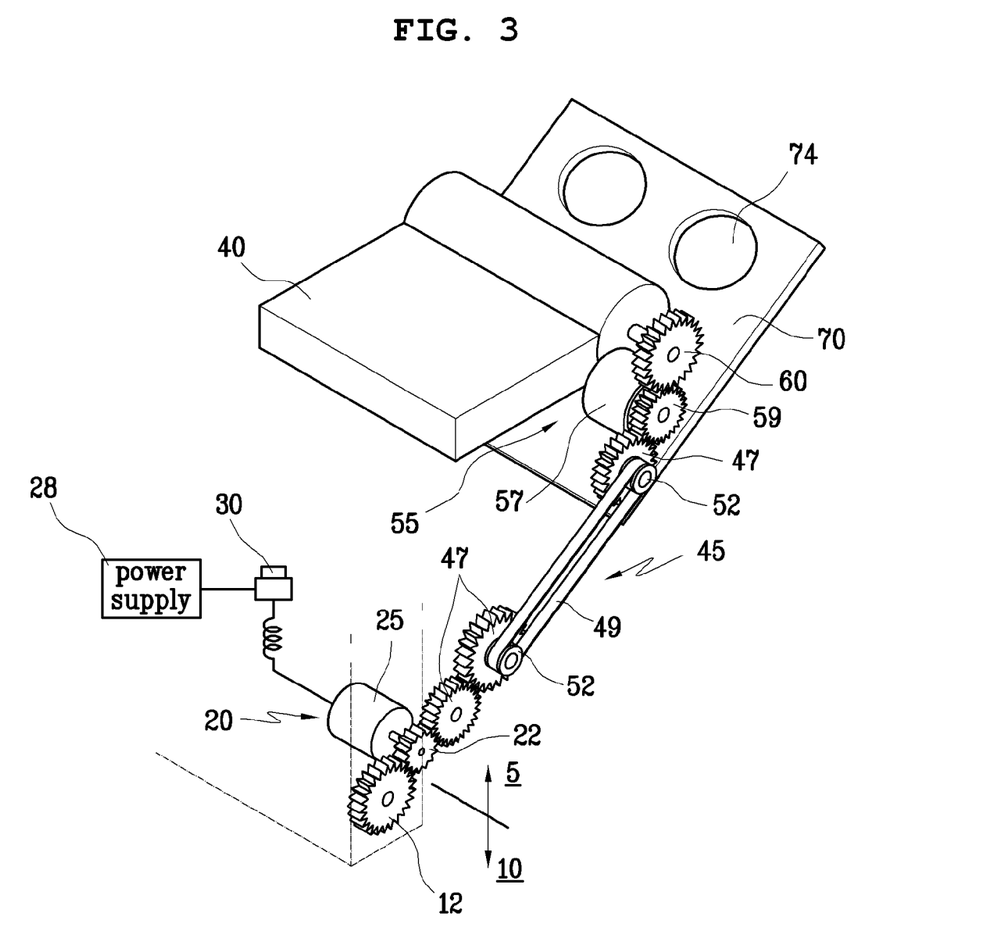
FIG. 3 is a view explaining the driving system of a gear train installed on a convenience apparatus for automotive rear seats according to the preferred embodiment of the present invention.

As illustrated in FIGS. 2 and 3, the convenience apparatus 1 for automotive rear seats is disposed in a space 10 into which the arm rest 5 of the rear seats is folded between the backrests of the rear seats, and works in conjunction with the arm rest 5.

A convenience apparatus according to a preferred embodiment comprises a base gear 12, which is none-rotatably fixed in the rear-seat backrest space 10 into which the arm rest 5 of the rear seats is folded.

The base gear 12 is engaged with a driving gear 22, which will be described below.

Further, the convenience apparatus comprises a driver 20 for folding and unfolding the arm rest 5 with respect to the rear-seat backrest space 10. The driver 20 includes the driving gear 22, which is engaged with the base gear 12, and a motor 25, which rotates the driving gear 22. The driving gear 22 is rotated by the operation of the motor 25.

In other words, the driver 20 has a structure in which the motor 25 is mounted in the arm rest 5 and is operated to rotate the driving gear 22 in engagement with the base gear 12.

Further, the motor 25 of the driver 20 is adapted to be electrically connected to a power supply 28, which is installed on a vehicle, through a separate switch 30, and is rotated in a forward or backward direction.

Figure 4:
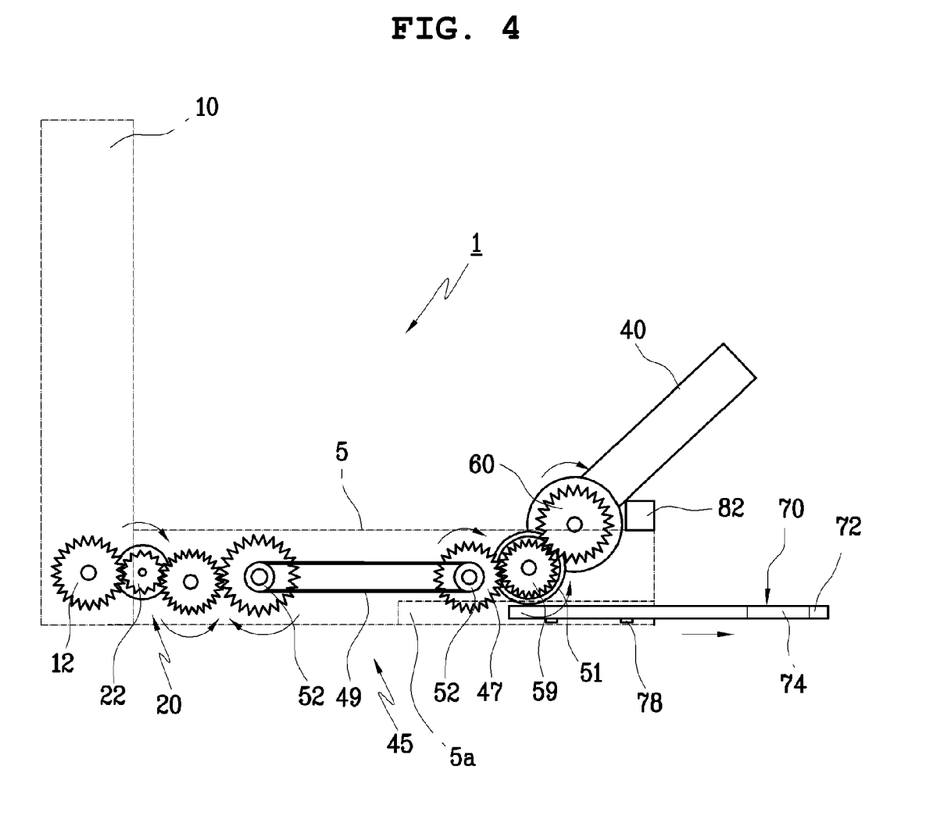
FIG. 4 is a side sectional view illustrating the state in which a convenience apparatus for automotive rear seats according to the preferred embodiment of the present invention is unfolded when used.

In this driver 20, when the motor 25 is rotated in a forward (or clockwise) direction as shown in FIG. 4, the driving gear 22, which is coupled to a rotating shaft of the motor 25, is subsequently rotated in a forward (counterclockwise) direction. Thereby, the arm rest 5 is pivoted about the rear-seat backrest space 10 from an erect state to an approximately horizontal state, and thus is unfolded from the rear-seat backrest space 10.

In contrast, when the motor 25 of the driver 20 is rotated in a backward (or counterclock) direction, the driving gear 22, coupled to the motor 25, is subsequently rotated in a backward direction. Thereby, the arm rest 5 is pivoted about the rear-seat backrest space 10 from an approximately horizontal state to an erect state, and thus is folded toward the rear-seat backrest space 10.

Further, the convenience apparatus comprises an integrated audio-video (AV) monitor 40, which is pivotably connected to the front end of the arm rest 5. The integrated AV monitor 40 is connected to the driving gear 22 so as to be driven through a gear train 45. Thus, the integrated AV monitor 40 is folded or unfolded while the arm rest 5 is folded or unfolded.

Figure 6:
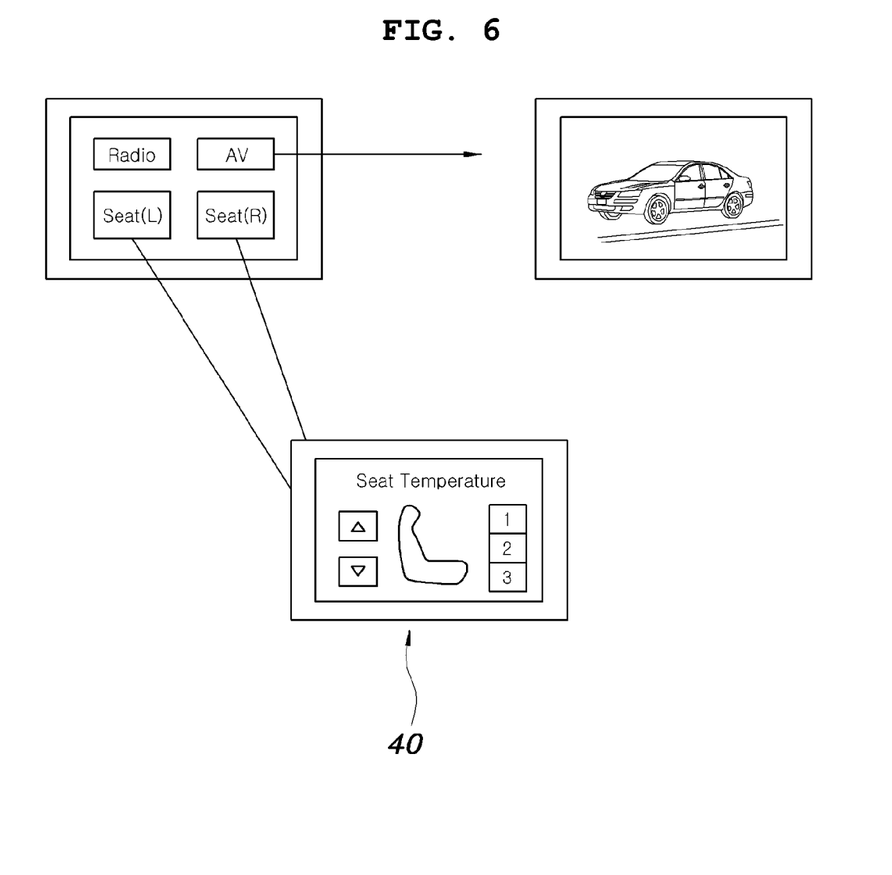
FIG. 6 is a view illustrating the screen of an integrated AV monitor in a convenience apparatus for automotive rear seats according to the preferred embodiment of the present invention.

Here, the integrated AV monitor 40 has the same operation mode as a touch screen, and is adapted to display an option menu, including a radio, AV, and rear seat selection controller, as illustrated in FIG. 6, so that a passenger can control the rear seat through the integrated AV monitor 40.

For example, when the passenger selects the radio and the AV in a touch screen operation mode, the integrated AV monitor 40 can display the same screen interface as a passenger side seat. When the AV is selected, the integrated AV monitor 40 can directly display an image on a liquid crystal display (LCD) screen.

In addition, when the rear seat selection controller is operated, the temperature of each rear seat, the upward and downward movement of a door window, and the angle of each rear seat can be controlled. The positions of each rear seat can be previously stored, and then a desired one of the positions can be selected and returned to.

Further, the gear train 45 is connected to the driving gear 22 so as to be able to transmit driving power of the motor, and thus is adapted to fold or unfold the integrated AV monitor 40 when the arm rest 5 is folded and unfolded. As illustrated in FIG. 3, the gear train 45 includes a dual gear 55 which has a rubber roller 57 and a plane gear 59 coaxially and integrally coupled with the rubber roller 57. The plane gear 59 is connected with a plurality of intermediate gears 47 through a belt 49 and pulleys 52, and a rotary gear 60. The rotary gear 60 is coupled to the rotational shaft of the integrated AV monitor 40.

The plurality of intermediate gears 47, which are disposed between the driving gear 22 and the plane gear 59 of the dual gear 55, are mounted on the arm rest 5 so as to be able to pivot with respect to the base gear 12. At least one pair of the intermediate gears 47 is disposed apart and connected by a belt 49 for transmitting power to each other. Each intermediate gear 47 of the pair has a pulley 52 integrally mounted on one side thereof. The belt 49 is wound around the pulleys 52.

This connection structure of the pulleys 52 and the belt 49 can easily transmit the power through the belt 49 even though the distance between the pulleys 52 is long, and thus not many intermediate gears 47 need to be mounted. Hence, not many intermediate gears are required, so that the structure of the gear train 45 can be simplified.

Thus, the rotary gear 60, coupled to the rotational shaft of the integrated AV monitor 40, receives the power from the driving gear 22 through the intermediate gears 47, the belt 49 and the pulleys 52, and is engaged with the plane gear 59 of the dual gear 55, which is engaged with one of the intermediate gears 47, so that the rotation of the driving gear 22 can be transmitted to the rotary gear 60.

In this power transmission structure, the motor 25 is driven to rotate the driving gear 22, and thus the arm rest 5 is pivoted. The rotating force of the driving gear 22 is transmitted to the integrated AV monitor 40, so that the integrated AV monitor 40 is folded or unfolded with respect to the arm rest 5.

Further, the present invention comprises a cup holder 70, which is mounted on the front end of the arm rest 5 so as to slide in and out. The cup holder 70 is coupled to the driving gear 22 so as to be driven through the gear train 45, and is adapted to slide in or out of the arm rest 5 when the arm rest 5 is folded or unfolded.

The cup holder 70 has a flat plate type body 72 in which a plurality of cup inserting holes 74, into each of which a cup can be fixedly inserted, are formed. This cup holder 70 is configured so that the flat plate type body 72 is slidably mounted in a guide hole 5a at the front lower end of the arm rest 5. The upper surface of the flat plate type body 72, mounted in the arm rest 5, is in contact with the rubber roller 57 of the dual gear 55.

When this cup holder 70 protrudes forward from the arm rest 5, the flat plate type body 72 having inserting holes 74 also protrude forward, so that the passenger can insert and fix a cup into the cup inserting holes 74.

Further, as illustrated in FIG. 4, the cup holder 70 includes rotational rollers 78, which are rotatably supported under the flat plate type body 72, and thus can smoothly slide in and out the guide hole 5a of the arm rest 5.

Figure 5:
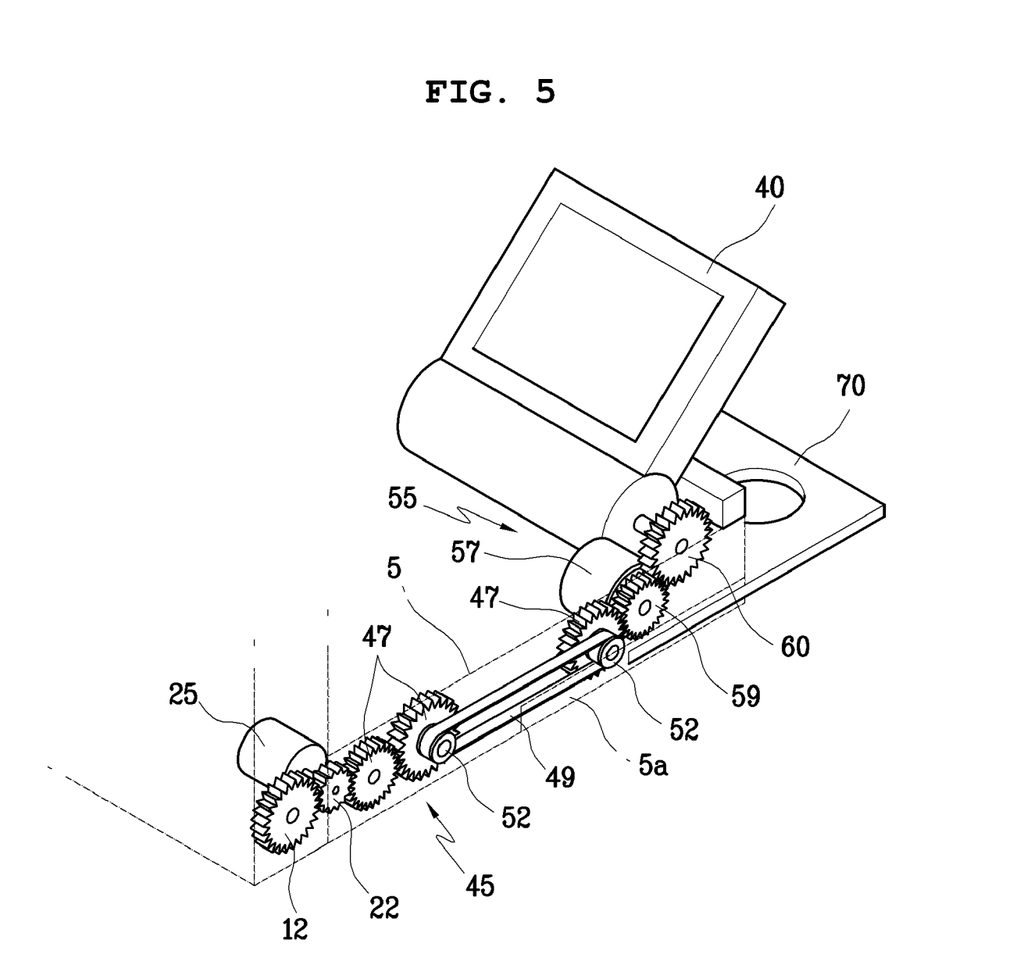
FIG. 5 is a perspective view illustrating the state in which a convenience apparatus for automotive rear seats according to the preferred embodiment of the present invention is unfolded when used.

To this end, the gear train 45 includes the dual gear 55, which is connected with the driving gear 22 to transmit power. As illustrated in FIGS. 3 and 5, the dual gear 55 includes the plane gear 59 having the rubber roller 57 integrally formed therewith to receive the rotating force from the driving gear 22. In this manner, the rubber roller 57, integrated with the plane gear 59, is adapted to move the cup holder 70 in forward and backward directions while it is in contact with the upper surface of the flat plate type body 72 of the cup holder 70.

Further the dual gear 55 is adapted so that the plane gear 59 operates the rotary gear 60 to pivot the integrated AV monitor 40.

Accordingly, the rotation of the dual gear 55 moves the cup holder 70 in forward and backward directions, and simultaneously unfold and fold the integrated AV monitor 40.

Meanwhile, as shown in FIG. 4 the convenience apparatus 1 mounts thereon a stopper 82 for supporting the integrated AV monitor 40 on the front end of the arm rest 5. Thus, when a passenger touches the touch screen when the integrated AV monitor 40 is in an unfolded state, the integrated AV monitor 40 does not turn/move any further in response to the touching force.

The convenience apparatus 1 is mounted on the arm rest 5 between the rear seats of the vehicle. Thus, as the arm rest 5 is folded or unfolded, the integrated AV monitor 40 is folded or unfolded, and simultaneously the cup holder 70 moves backward and forward with respect to the arm rest 5.

In detail, when a passenger of the vehicle pushes the separate switch 30 to drive the motor 25 of the driver 20, the driving gear 22 is rotated by the driving of the motor 25, and thus the arm rest 5 is pivoted so as to unfold from the rear-seat backrest space 10 in an approximately horizontal direction.

At this time, the driving gear 22 rotates the dual gear 55 through the gear train 45, and the rubber roller 57 of the dual gear 55 moves the cup holder 70 from the guide hole 5a of the arm rest 5 in a forward direction in surface contact with the cup holder 70. Simultaneously, the plane gear 59 of the dual gear 55 rotates the rotary gear 60, and the rotary gear 60 rotates the integrated AV monitor 40. Accordingly, the integrated AV monitor 40 is pivoted from the folded state to the unfolded state, as illustrated in FIGS. 4 and 5. These unfolding operations of the arm rest 5, the AV monitor 40 and the cup holder 70 can be easily understood by the several working arrows which teach operation directions shown in FIG. 4 In the unfolded state, the integrated AV monitor 40 displays, for instance, a menu, as illustrated in FIG. 6.

Thus, a passenger who sits in the rear seat can control desired conveniences using the integrated AV monitor 40 unfolded in this way.

For example, the passenger can select the radio or the AV through a touch screen operation mode, or operate the rear seat selection controller to control the temperature of the rear seat(s), the position of the window, and the angle of the rear seat(s).

On the other hand, the passenger can push the switch 30 again in order to restore the convenience apparatus to its original state when the vehicle arrives at its destination, or as necessary. Thereby, the motor 25 of the driver 20 rotates in a backward (counterclockwise) direction, and thus the driving gear 22 is rotated in a backward direction. Thereby, the arm rest 5, which has been unfolded in the approximately horizontal direction, is folded into the rear-seat backrest space.

At the same time, the backward rotation of the driving gear 22 rotates the dual gear 55 in a forward direction, and thus moves the cup holder 70 into the arm rest 5. Further, the dual gear 55 rotates the rotary gear 60 in a backward direction, so that the integrated AV monitor 40 can be converted from the unfolded state to the folded state.

In this manner, the cup holder 70 and the integrated AV monitor 40 are restored to the original state thereof, and the arm rest 5 is folded into the rear-seat backrest space.

As described above, in the present invention, the integrated AV monitor 40 and the cup holder 70 are mounted in the arm rest 5 for the rear seats. As the arm rest 5 is unfolded, the integrated AV monitor 40 is automatically unfolded, and the cup holder 70 automatically moves in a forward direction. Thus, the passenger can control the rear seat(s) through the integrated AV monitor 40. As a result, the passenger can conveniently use the present invention, and the efficiency of use of the interior of the vehicle can be maximized because no space for installing separate controllers in the interior of the vehicle is required.

Since the passenger who sits in the rear seat controls the rear seat using the integrated AV monitor 40 unfolded from the arm rest 5, the viewing angle of the passenger is greatly improved compared to the prior art, and thus the passenger can very conveniently use the present invention.

Further, the performance of the present invention can be structurally maximized since the arm rest 5, the cup holder 70, and the integrated AV monitor 40 all make use of one motor 25. Since the arm rest 5, the cup holder 70, and the integrated AV monitor 40 are located in the rear-seat backrest space when not used, the present invention can be easily protected from damage.

Although an exemplary embodiment of the present invention has been described for illustrative purposes, those skilled in the art will appreciate that various modifications, additions and substitutions are possible, without departing from the scope and spirit of the invention as disclosed in the accompanying claims.

The invention claimed is:

1. A convenience apparatus for automotive rear seats, the apparatus comprising:
 a base gear non-rotatably fixed to at least one of the rear seats, a space between which an arm rest is movably mounted;
 a driver, which has a driving gear engaged with the base gear and a motor for rotating the driving gear, for folding or unfolding the arm rest into or from the space using a driving force of the motor;
 an integrated audio/video (AV) monitor which is rotatably coupled to a front end of the arm rest and is connected to the driving gear through a gear train so as to be able to be folded or unfolded with respect to the arm rest while the arm rest is folded or unfolded; and
 a cup holder which is mounted so as to be able to slide into or out of a hole defined in the front end of the arm rest and is connected to the driving gear through the gear train so as to be able to move into or out of the arm rest while the arm rest is folded or unfolded.

2. The apparatus according to claim 1, wherein the motor is mounted in the arm rest, and the driving gear is rotated in engagement with the base gear by the motor.

3. The apparatus according to claim 1, wherein the gear train includes a dual gear connected with the driving gear so as to be able to transmit driving power of the motor and a rotary gear coupled to a rotating shaft of the integrated AV monitor so as to pivot the integrated AV monitor.

4. The apparatus according to claim 3, wherein the gear train includes a plurality of intermediate gears between the driving gear and the dual gear, and at least one pair of the intermediate gears is disposed apart and connected by a belt.

5. The apparatus according to claim 4, wherein the dual gear includes a rubber roller and a plane gear coaxially and integrally formed with the rubber roller.

6. The apparatus according to claim 5, wherein the rubber roller is in surface contact with an upper surface of the cup holder so as to be able to move the cup holder in forward and backward directions, and the plane gear integrated with the rubber roller is engaged with the rotary gear of the integrated AV monitor.

7. The apparatus according to claim 6, wherein the cup holder includes a flat body including a plurality of cup holes, into which a cup can be inserted and fixed.

8. The apparatus according to claim 7, wherein the flat body is provided with at least one roller rotatably supported thereunder for smoothly sliding the cup holder into or out of the hole defined in the arm rest.

9. The apparatus according to claim 1, wherein the integrated AV monitor has a touch screen operation mode, and displays an option menu including a radio, audio, video, and rear seat selection controller such that a passenger of the vehicle controls at least one of the rear seats through the integrated AV monitor.

10. The apparatus according to claim 1, wherein the arm rest includes a stopper for supporting the integrated AV monitor at the front end thereof.

* * * * *